United States Patent [19]
Jaeger

[11] Patent Number: 4,586,289
[45] Date of Patent: May 6, 1986

[54] VACUUM INSULATING WINDOW AND REFLECTOR

[76] Inventor: Warren V. Jaeger, 57 Todd Hill Rd., Poughkeepsie, N.Y. 12603

[21] Appl. No.: 720,536

[22] Filed: Apr. 8, 1985

Related U.S. Application Data

[63] Continuation-in-part of Ser. No. 545,095, Oct. 25, 1983, abandoned, which is a continuation of Ser. No. 316,043, Oct. 28, 1981, abandoned.

[51] Int. Cl.$^4$ .............................................. E06B 7/08
[52] U.S. Cl. ......................................... 49/64; 160/107
[58] Field of Search ................... 49/64, 357; 160/107, 160/104; 52/202, 203

[56] References Cited

U.S. PATENT DOCUMENTS

| | | | |
|---|---|---|---|
| 2,281,071 | 4/1942 | Knudsen | 49/64 |
| 2,486,000 | 10/1949 | Browning | 49/64 X |
| 3,292,309 | 12/1966 | Horner | 49/64 |
| 4,245,435 | 1/1981 | Ulbricht | 160/107 X |
| 4,357,187 | 11/1982 | Stanley et al. | 52/203 |

Primary Examiner—Kenneth Downey
Attorney, Agent, or Firm—Richard L. Miller

[57] ABSTRACT

A vacuum insulating window and reflector for controlling the heat gain and loss of a structure in which rotary vanes redirect infra red radiant energy while at the same time thermal transfer due to convection and conduction are reduced to a minimum.

14 Claims, 5 Drawing Figures

VACUUM INSULATING WINDOW AND REFLECTOR

This application is a continuation in part of application 06/545,095 filed 10/25/83 now abandoned, which in turn was a continuation application of original parent application 06/316,043 filed 10/28/81, now abandoned and for which there has been maintained a continuous chain of copendency.

BACKGROUND OF THE INVENTION

Modern architecture and passive solar design both call for increased use of glazing in structures. Although advances have been achieved in the insulating properties of walls and ceilings, windows remain comparatively poor insulators.

The current state of the art in window design uses multiple glazed windows in which two or three panes of glazing contain an entrapped air space, or spaces. The intervening air, or sometimes other gas, is used as an insulator. Although significantly better than single pane windows, these multiple glazed windows are still relatively poor insulators.

Heat is lost through double glazed windows in three ways, conduction, convection and radiation. The inside pane of a double glazed window in a heated structure absorbs heat from it's surroundings. Some of this heat is conducted directly through the air between the panes, to the outside pane. When the space between the panes is greater than ⅜ of an inch convection currents occur between the panes. The air tends to move in circular fashion, absorbing heat from the inner pane and delivering it to the outer pane.

These two methods of heat loss are common knowledge to anyone possessing ordinary skill in the art. It might appear obvious to such a person of only ordinary skill, that the insulating properties of a window could be greatly enhanced by removing the air between the panes, and thus eliminating the loss of heat resulting from conduction and convection. However, a little bit of knowledge can be a dangerous thing. This conclusion rests on the assumption that the amount of heat transmitted by radiation remains constant. Detailed experimentation and testing by this applicant has revealed that this assumption is incorrect and that when the air is removed from between the panes of a double glazed window, the amount of heat transmitted through the window is not reduced but actually doubled. Further detailed experimentation and testing by this applicant has revealed the means by which this surprising result occurs quite contrary to the result which was assumed would be the obvious effect by those possessing only ordinary skill and knowledge.

The inner warmer pane of the window emits long wave infra-red radiations which travel toward the colder outside pane. When the intervening space between the panes contains air, approximately two thirds of these radiations are absorbed by the air and the heat is thereafter slowly conducted and convected to the outer pane, actually intercepting the high speed radiations. When the air is removed however, and there is therefor no absorption medium, the long wave infra red radiations, which travel at the speed of light, rapidly transmit heat from the inner pane to the outer pane at a greatly accelerated rate transmitting an even greater amount of heat than that saved by the elimination of conduction and convection and resulting in a total heat transfer twice as large as that occurring through the an evacuated window.

Stanley et al. in U.S. Pat. No. 4,357,187 entitled WINDOW OVERLAY FOR THERMAL INSULATION, made the apparently obvious but incorrect assumption that evacuating the window to any degree would increase insulating effectiveness. Clearly Stanley et al did not properly test their assumption or they would have learned that what seemed obvious to them was in practise incorrect and produces the opposite and undesirable result. Stanley et al have proposed their invention as an energy conserving means. However, actual implementation of their proposed invention results in increased energy loss. This put in serious question, the validity of the Stanley et al patent as it is clearly not "USEFULL".

In any event, teachings and conclusions, which are scientifically and experimentally untrue can hardly be cited as valid prior art.

SUMMARY OF THE INVENTION

It is the object of the instant invention to substantially reduce all THREE forms of heat transmission simultaneously, through a double glazed window so that the net heat transmission through the instant invention will be considerable less than any other currently known window.

In order to accomplish this goal the instant invention has a set of adjustable rotatable, vanes placed within an evacuated space between the panes of a more or less typical double glazed window. These vanes must have the special capability of being able to reflect or redirect light and heat radiation in the visible spectrum, emitted by a source of temperatures of 1000° C. or more and having wavelengths of 7,500 angstrom or less, while simultaneously, and most importantly further having the ability to also reflect and or redirect infra red radiations in the non visible spectrum, emitted by a source having a temperatures of less than 1000° C. and wavelengths greater than 7,500 angstroms, referred to as long wave infra red radiations.

In order for these vanes to achieve an even moderate degree of efficiency, several conditions must be present and coexisting at the same time.

First of all the vanes must have a highly polished optically reflective front mirror, of non ferrous metallic surface facing the direction of the infra red radiation which is to be redirected.

Secondly the evacuated space in which the vanes are enclosed must have a substantially good vacuum of at least 130 torr and ideally to ultra high vacuum such as $1 \times 10^{-12}$ torr for maximum results.

Thirdly in order to make the invention practical there must be a mechanism for adjusting or aiming the redirected infra red radiation while maintaining the integrity of the vacuum in the evacuated space. Because depending on whether it is winter or summer, where the sun is in the sky, and whether it is day time or night time, radiation either has to be directed back into the structure to keep it warm during cold weather, or away from the structure keep it cool in the summer.

While it is appreciated that there are other inventions which attempt to address part of the problem such as U.S. Pat. Nos. 4,245,435 to Ulbricht; 3,292,309 to Horner; 2,486,000 to Browning; and 2,281,071 to Knudsen none of these inventions even recognize the requirements which exist when attempting to redirect long wave infra red radiation. In fact none of this prior art even acknowledges that infra red long wave radiation is the single mechanism of transmitting heat through and evacuated space, emitted by a warm pane.

Because these inventions do not acknowledge the long wave infra red radiation mechanism none have all of the simultaneously necessary components and conditions present all at the same time. Namely, none teach or realize that the reflective vane must be metallic, non ferrous, highly polished, face mirrored, and in a high degree of vacuum all at the same time.

In actuality there are many uses for the instant invention. Properly utilized to its fullest extent it should have its vanes controlled by an automatic system employing a computer specially programed with optimizing data so that the positions of the vanes can be precisely controlled in accordance with a predetermined program which takes in many variable conditions germane to the actual location of the installation.

Further objects of the invention will appear as the description proceeds.

For the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DESCRIPTION OF THE PREFERRED EMBODIMENTS

Figure 1:
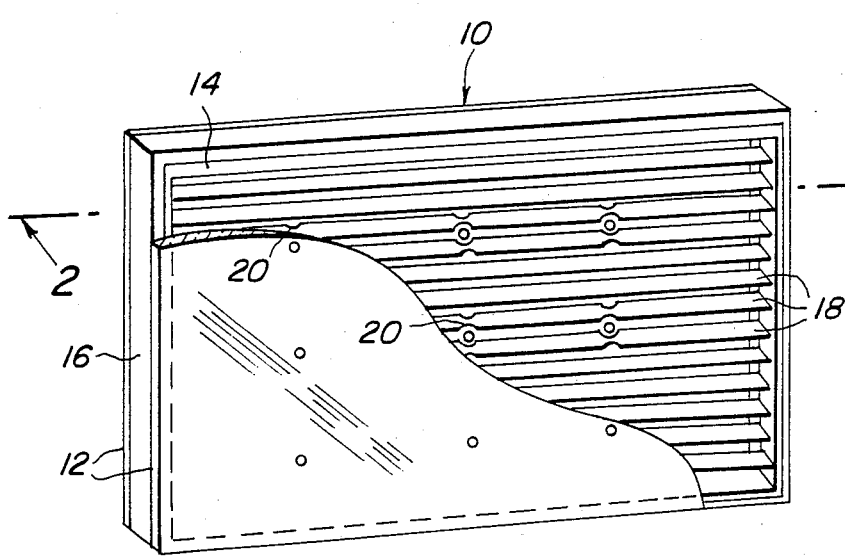
FIG. 1 is a perspective view of a typical embodiment of the invention with part of the front glazing cut away.

Referring to FIG. 1 there is shown a typical embodiment of the instant invention generally at 10, wherein two panes of glazing 12 are separated by a U-shaped frame 14. The space between the panes which extends beyond the frame is filled with a sealant material 16. The vanes 18 are shown in a horizontal array positioned in the frame 14. Notches 20 are shown at the edges of some vanes to permit these vane to fully close around separator posts 22 not indicated on FIG. 1. The separator post, are typically held in place by separator buttons 24 which are firstly secured to the glazing 12, or possibly integrally formed therewith.

The space 26 between the panes of glazing 12 must be evacuated to a high degree. That is to a value of 130 torr or lower. A higher degree of vacuum that is lets say, $1 \times 10^{-12}$ torr, further improves the efficiency of the invention and in general there can not be too high a degree of vacuum. However if a sufficient degree of vacuum is not maintained, then the device becomes completely inoperative for it's intended purpose as a thermal insulator although it might still function well as an ordinary window with an expensive fancy blind or shutter.

In addition, in order that the instant invention function at all as a thermal insulator, it is an absolute requirement that at least one side of the vanes have a highly polished optically reflective nonferrous metallic surface 28. Although the vane 18 itself may be fabricated from many suitable materials, such as plastic, and metal either ferrous or nonferrous, it can not be over emphasized that the surface which is to reflect the long wave infra red radiant energy must have all of these properties simultaneously present, that is shiny, metallic, and non ferrous. Metals which work well are gold, silver, copper, aluminum, and platinum, and a host of alloys. Without getting into the theory of the physics of what is taking place on this surface it will just be again emphasized that solely ferrous metal is not suitable for this surface and will not work and would render the instant invention inoperative for its intended purpose as a thermal insulating device.

Figure 4:
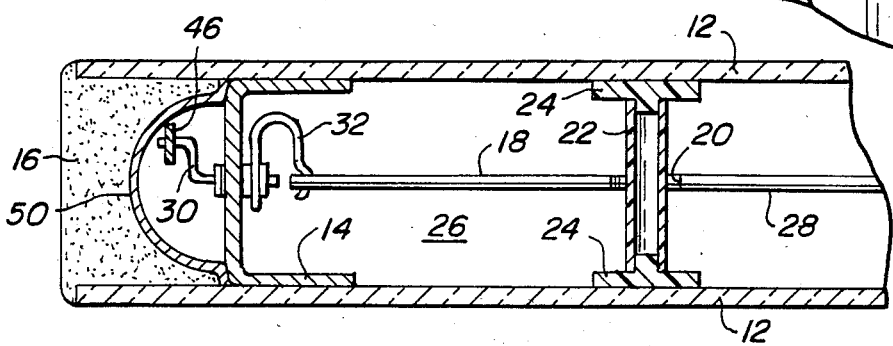
FIG. 4 is a partial cross sectional view taken along line 4—4 of FIG. 2.

FIG. 4 is an enlarged cross sectional view illustrating better the relationship of some of the components. Hence we see that an inner frame 14 holds crank pins 30 which are mounted through holes in the frame and held in placed with suitable fastener as is well known in the art. Such typical fasteners might well be a grove with a snap C-shaped ring, or nuts and washers on suitable threads not illustrated in detail for the sake of clarity, which would permit the crank to freely rotate. The interior of each crank pin is connected to a two fingered spring 32 which engages openings 34 in vanes 18. The vanes are a thin material, covered with the highly polished finish 28 as previously described, and are held taut between the springs as illustrated, it being understood that a similar duplicate arrangement of springs are at each end of the vanes. A prime mover device such as a servo motor 38, and an appropriate gear box 52 are typically connected by a shaft 40. However it is to be well understood that there are many devices well known in the art which would be suitable. Just to mention a few 38 could also be a type of fluidal device, or the combination of 38, and 52 could be any number of rotary solenoids or even a hydraulic piston and cylinder arrangement could be satisfactorily installed by one well skilled in the art.

In many instances the invention may be employed in multiple such as in a large office building, hotel, etc where the position of the vanes might well be controlled by a computer system specially structured for this purpose. This type of automation requires that the computer have at least a position feed back signal so as to be able to properly redirect the infra red radiation being reflected back by the vanes 18 in an optimum and efficient manner. In this situation a shaft encoder device 36 is required to be connected to the operating device so that a position feed back signal is available for the automation feed back loop signals needed by such a computer. Naturally the exact details and specifications of this component will be dictated by the nature of the automation system. This component it should be understood, is therefore optional and depends upon the sophistication of the system in which the instant invention is to be used.

For completeness, a wire harness 54 is shown leaving the instant invention hermetically sealed which carries both the servo motor input signal as well as the shaft encoder position output signals. It should be remembered of course, that in actuality this input and output harness may contain hydraulic or pneumatic lines as well as electric wires or optical fibers depending upon the nature of the component dictated by the automation system's specifications and parameters that are to be mated with this instant invention.

In any case, when operating wheel 42 turns, connecting rod 44 moves up or down transmitting the motion to the crank pins 30 which are all connected by connecting strip 46 thus causing all crank pins to rotate in unison. It is also to be understood that there is a duplicate arrangement of crank pins, springs and connecting strip, at the opposite end of the array of vanes which are not illustrated. Shaft 48 delivers the motion to the opposite arrangement so that the vanes are rotatively torqued from both ends simultaneously.

Figure 3:
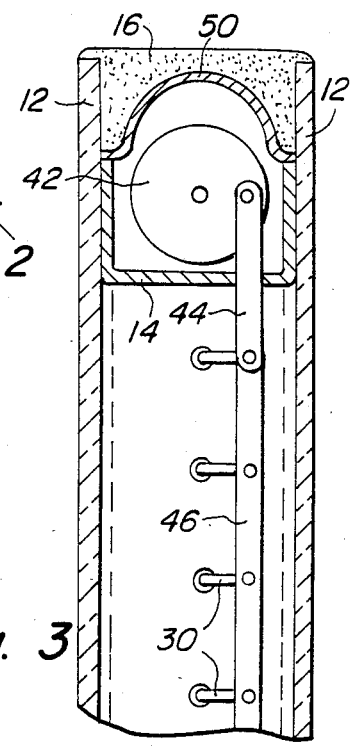
FIG. 3 is a partial longitudinal cross sectional view taken along line 3—3 of FIG. 2.
Figure 2:
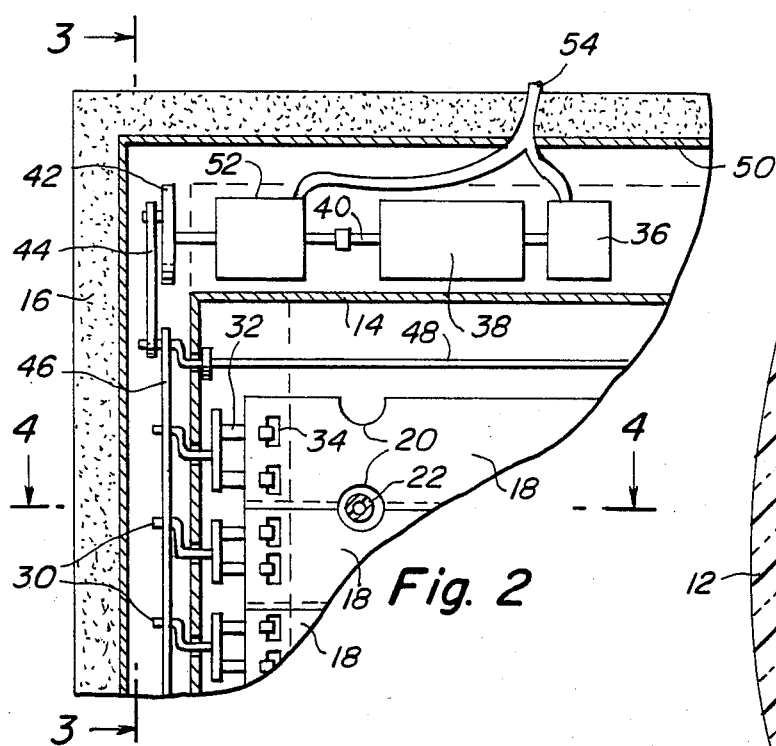
FIG. 2 is a partial vertical cross sectional view taken along line 2—2 of FIG. 1 showing the internal components.

FIGS. 3 and 4 are respective sections taken along lines 3—3 and 4—4 in FIG. 2 and simply make it easier to visualize the cooperation of like numbered parts indicated in the other figures. The inner U-shaped channel is shown at 14, with outer channel 50 in place. Sealant 16 fills the space between the panes of glazing 12, and the outer channel 50.

FIG. 4 additionally shows separator buttons 24 connected by separator post 22 and how this strengthening member avoids interfering with the vanes 18, because notch 20 provides ample clearance.

Figure 5:
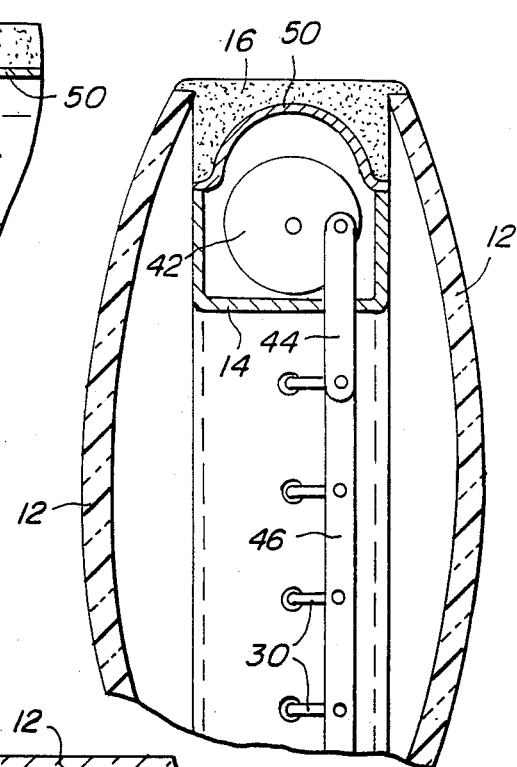
FIG. 5 is a partial cross sectional view taken in the position of line 3—3 of FIG. 2 of another embodiment illustrating curved panes to increase the external strength of the invention, against atmospheric pressure without the use of separator posts and buttons illustrated in the first embodiment.

FIG. 5 is a view of another embodiment similar to FIG. 3 illustrating how the device might be typically fabricated with curved glazing in order to prevent the device from collapsing from atmospheric pressure, without the use of post and buttons. Naturally, like numbers indicate like parts.

While certain novel features of this invention have been shown and described and are pointed out in the annexed claims, it will be understood that various omissions, substitutions and changes in the forms and details of the device illustrated, and in its operation, can be made by those skilled in the art without departing from the spirit of the invention.

What is claimed is:

1. A vacuum insulating window and reflector for controlling the heat gain and loss efficiency of an enclosed space and structure, which comprises:
   (a) a visually transparent panel having a substantially evacuated hollow cavity;
   (b) at least one adjustable vane contained within said hollow cavity;
   (c) a highly reflective metallic nonferrous surface on said at least one adjustable vane;
   (d) means for externally adjusting the position of said, at least one adjustable vane, from an outside of said visually transparent panel, while maintaining the integrity of a vacuum in said hollow cavity, whereby the amount of heat and radiant energy passing through said vacuum insulating window and reflector is controlled by the position of said at least one adjustable vane; and
   (e) strengthening means provided to reinforce the strength of said visually transparent panel without interfering with any movement of said adjustable vanes, wherein said strengthening means further comprises at least one convex outward visually transparent panel.

2. A vacuum insulating window and reflector as recited in claim 1, wherein there are at least two adjustable vanes, and said strengthening means is at least one separator post which spans said substantially evacuated hollow cavity in a space between said adjustable vanes to reinforce the strength of said visually transparent panel without interfering with any movement of said adjustable vanes.

3. A vacuum insulating window and reflector as recited in claim 2, wherein there is at least one curved notch in an edge of at least one of said adjustable vanes enabling said at least one separator to pass through said at least one curved notch without interfering with any movement of said adjustable vanes.

4. A vacuum insulating window and reflector as recited in claim 2, wherein means for externally adjusting the position of said vanes further comprises a connecting strip and crank pins ganged together by said connecting strip so that all vanes move together in unison.

5. A vacuum insulating window and reflector as recited in claim 2, wherein each vane rotates about axes which are parallel to each other, and a force means is provided to supply tension in a direction parallel to said axis to keep said each vane taut.

6. A vacuum insulating window and reflector as recited in claim 5, wherein said force means is at least one spring.

7. A vacuum insulating window and reflector as recited in claim 4, wherein means for externally adjusting the position of said vanes is contained completely within said hollow cavity and further comprises;
   (a) a prime mover fixedly mounted within said cavity;
   (b) an output shaft to transmit movement from said prime mover;
   (c) an operating wheel fixed securely to said output shaft so as to rotate therewith and having a crank pin rigidly mounted near a circumference of said wheel; and
   (d) a connecting rod swivel connected to said crank pin, to transmit motion to said connecting strip, whereby said vanes will rotate in response to forces caused by said prime mover.

8. A vacuum insulating window and reflector as recited in claim 7, wherein said prime mover is an electromechanical device.

9. A vacuum insulating window and reflector as recited in claim 7, wherein said prime mover is a combination of a servo motor and a gear box.

10. A vacuum insulating window and reflector as recited in claim 7, wherein said prime mover is a fluid activated device.

11. A vacuum insulating window and reflector as recited in claim 7, wherein said prime mover is a combination of a fluidal motor and a gear box.

12. A vacuum insulating window and reflector as recited in claim 7, wherein there is provided a means for sensing the position of said vanes.

13. A vacuum insulating window and reflector as recited in claim 12 wherein said means for sensing the position of said vanes is a shaft encoder device which rotatively is engaged with said output shaft whereby the position of said vanes can be determined from the information output port of said shaft encoder device.

14. A vacuum insulating window and reflector as recited in claim 7, wherein said vacuum measure is defined by a number of 130 torr or below.

* * * * *